UNITED STATES PATENT OFFICE.

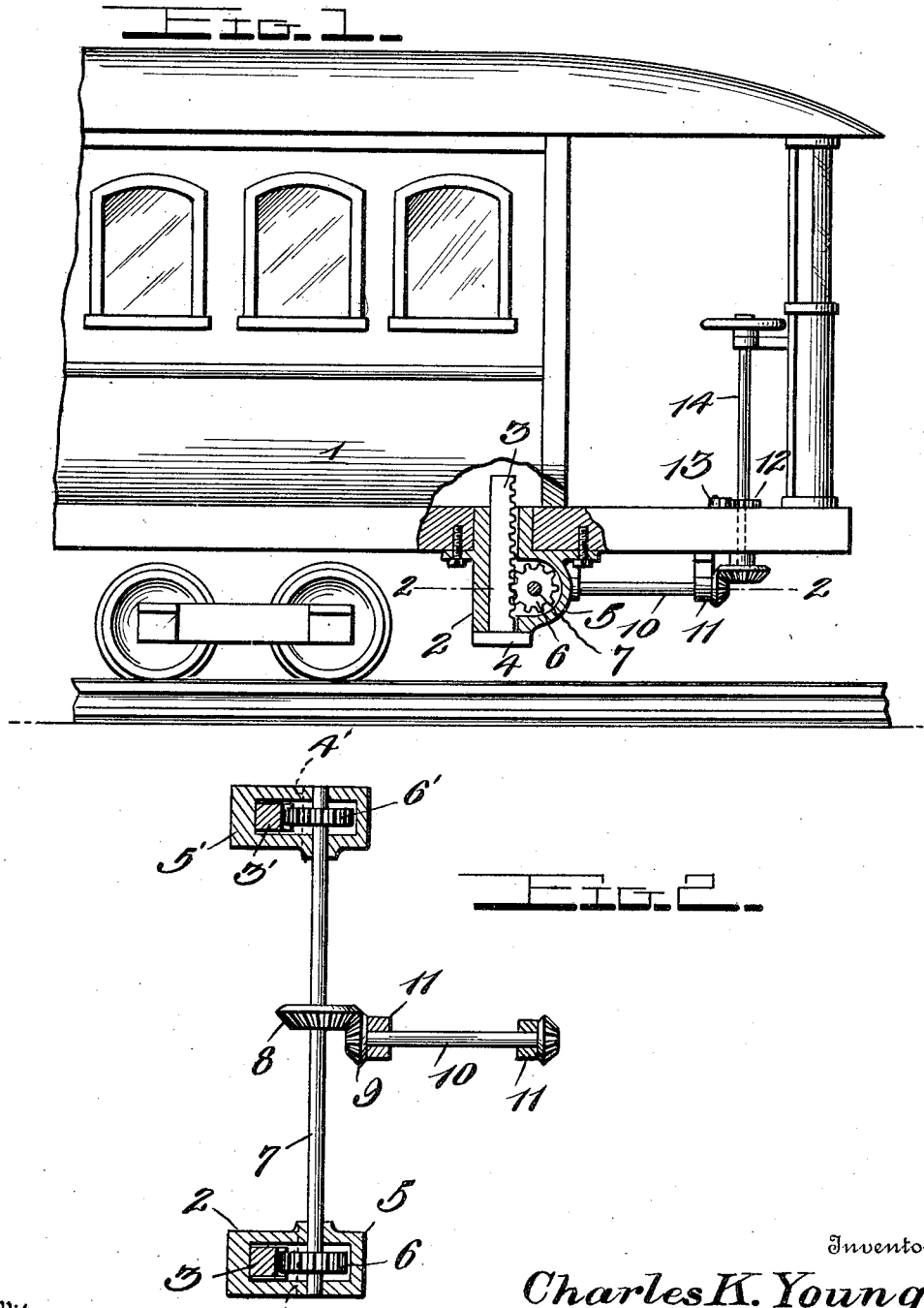

CHARLES K. YOUNG, OF PHILADELPHIA, PENNSYLVANIA.

CAR-RAISER AND SAFETY-BRAKE.

999,424.  Specification of Letters Patent.  Patented Aug. 1, 1911.

Application filed May 11, 1911. Serial No. 626,486.

*To all whom it may concern:*

Be it known that I, CHARLES K. YOUNG, a citizen of the United States, residing at Philadelphia, in the county of Philadelphia and State of Pennsylvania, have invented certain new and useful Improvements in Car-Raisers and Safety-Brakes, of which the following is a specification, reference being had to the accompanying drawings.

This invention relates to railway cars and the like, and more particularly to a car raiser and safety brake for the same.

The objects of my invention are to provide a device which can be arranged to be used as a safety brake, and also as a car raiser when it should be desirable to use it in either way.

Further objects of my invention will become apparent as it is more fully set forth.

It is well known that the ordinary type of brake used on street cars and railway cars get out of order and will not work when they are most needed. By the use of this device a brake is provided, or a series of brakes whereby a positive brake action is brought into play and positively actuates on the rails to impede the progress of the car, or bring it to a quick stop, when desired.

In the accompanying drawings which illustrate one form of my invention, Figure 1 represents a view in elevation of a car provided with a device embodying my invention; and Fig. 2 is a detail of a safety brake and car raiser embodying my invention partly in section.

Similar reference characters refer to similar parts throughout the drawings.

In the construction illustrated by way of example in the appended drawings 1 represents a car which has mounted thereon a car raiser 2 at each corner of the car, preferably in front of the wheels at each end and are disposed as to be directly over the rails on which the car wheels run. The safety brake is composed of racks 3 and 3' which have plates 4 and 4' on the undersides of them, and are arranged to reciprocate in casings 5 and 5' which are secured to the underside of the car. In order to actuate the racks, a pair of gears 6 and 6' are mounted so as to engage with the teeth of the racks and are suitably supported at each end of a shaft 7 which is journaled to the bottom of the car and has a beveled gear 8 so disposed on it as to be engaged and actuated by a beveled gear 9 which is mounted on a shaft 10 suitably supported by the car by a hanger 11.

Mounted on the staff 14 is a ratchet wheel 12 which is arranged to be engaged by a pawl 13, and to the staff 14 is secured a wheel or other suitable actuating means arranged to be disposed at either end of the car so as to be readily actuated by the motorman or conductor or the like, in order to put the safety brake or car raisers in action.

In operation the operator actuates the handle or other suitable means of the actuating mechanism 14 and thereby the transmission system, the shaft 10, the beveled gears 8 and 9, the shaft 7, and the gears 6 and 6', which actuate and propel the racks 3 and 3' downwardly, and on to the rails which are disposed beneath the car, or on to the ground as the case may be.

When the plates have come in contact with the rails they of course exert a braking action on them, and tend to stop the car, this action will be very powerful.

When it is desired to raise the car for repair or inspection purposes the actuating mechanism 14 is simply operated sufficiently to raise the car to a desired height off the ground, as the length of the racks 3 and 3' are sufficient to be used for this purpose. It is of course understood that should it be desirable to raise only the racks at one end that the same can be done, or in any case it is desired to actuate both racks the same can be done together, as each is independently actuated of the other.

When it is not required to use the devices they are simply actuated and returned to their casings 5 and 5' so as to be out of the way and inconspicuous.

This device has many advantages, first, being comparatively light and of small cost to manufacture and install, secondly, it has a very strong and positive braking action, and thirdly, it can be used as a car raiser and thereby obviate the necessity of carrying jacks or the like in the cars for such purposes, in case of accidents. The use of the pawl 13, and its means of operation are too well known to need further description except that it may be actuated in any well known manner for preventing the braking device from turning backwardly while it is being put into use.

Obviously while I have described my device with but a pair of safety brakes at either end of the car, I anticipate the use of more or less than this number, in case the conditions arise that necessitate the use of more or less, and I anticipate the use of varied shapes of shoes or plates disposed at the bottom of the racks and do not wish to be limited to the particular shape or form shown in the drawings, and I do not wish to be limited in this or in any other way otherwise than necessitated by the prior art as many modifications in the construction of my invention may be made without departing from the principles thereof.

Having thus described the invention what is claimed is:

In combination with a car, a car raiser and safety brake comprising a pair of racks, a pair of casings for supporting said racks, plates disposed on the ends of said racks, gears for actuating said racks, a shaft for supporting said gears, a beveled gear disposed on said shaft for actuating the same, another beveled gear for actuating said beveled gear, a shaft for the last mentioned beveled gear, and means for actuating said shaft.

In testimony whereof I hereunto affix my signature in the presence of two witnesses.

CHARLES K. YOUNG.

Witnesses:
BENJ. W. SNYDER,
THOMAS P. GRIFFITH.

---

Copies of this patent may be obtained for five cents each, by addressing the "Commissioner of Patents, Washington, D. C."